Patented July 16, 1935

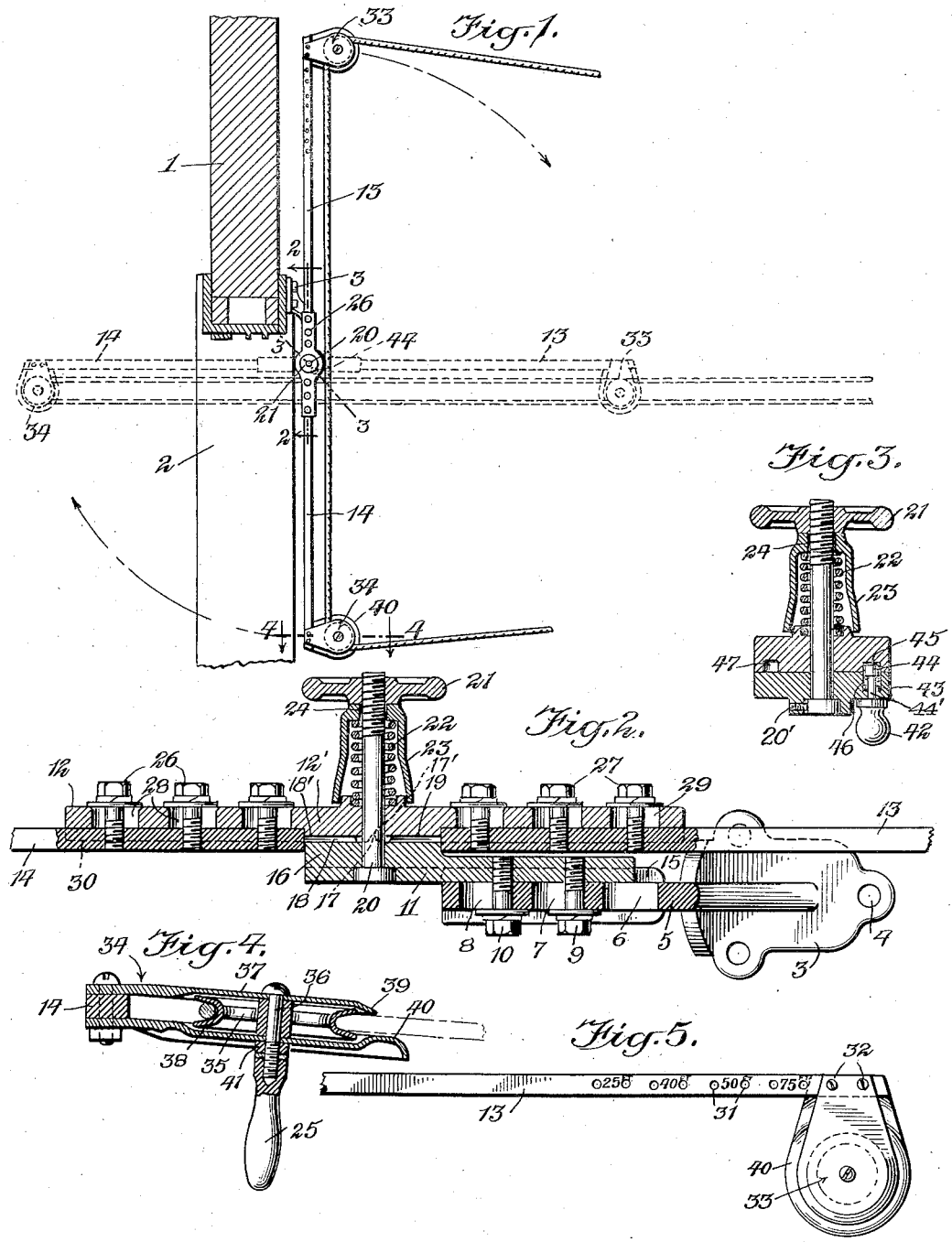

2,008,467

UNITED STATES PATENT OFFICE 2,008,467

CLOTHESLINE SUPPORT

Alfred Anthony Perry, Middle Village, Long Island, N. Y.

Application December 18, 1933, Serial No. 703,011

3 Claims. (Cl. 68—3)

This invention relates to clothes line supports and has for an object to provide an improved construction which may be easily mounted and easily manipulated after mounting.

Another object of the present invention is to provide a clothes line support which is adapted to swing in a horizontal plane and which will automatically remain substantially in position in which it is left.

A further object of the invention is to provide a clothes line support wherein there are provided a pair of arms, one of which is provided with a pulley adjustable toward and from the other arm so as to cause the device to be readily balanced under all circumstances.

An additional object of the present invention is to provide a clothes line support with a swinging support and coacting with this support an automatic locking structure for locking the support in either of two positions.

A still further object, more specifically, is to provide a clothes line support wherein there is provided pulleys formed with means for preventing fouling of the lines.

In the accompanying drawing—

Figure 1 is a horizontal sectional view through a window with a clothes line support shown attached thereto, the support disclosing an embodiment of the invention;

Figure 2 is a sectional view on the line 2—2, the same being on an enlarged scale, through Figure 1;

Figure 3 is a detailed fragmentary sectional view through Figure 1, approximately on the line 3—3;

Figure 4 is a sectional view on an enlarged scale through Figure 1 on the line 4—4;

Figure 5 is an enlarged plan view of the outside arm and pulley shown in Figure 1.

Referring to the accompanying drawing by numerals, 1 indicates the wall of a building, and 2 the frame of a window. Connected with the window frame is a bracket 3 which is shown more in detail in Figure 2 and wherein apertures 4 are provided for the reception of screws, bolts or other fastening means. This bracket is provided with an arm 5 having a number of elongated openings or slots 6, 7 and 8 through certain of which the bolts 9 and 10 are adapted to project, said bolts being threaded into the supporting fitting 11 which coacts with the arm-carrying bar 12, which carries the arms 13 and 14. The fitting 11 has one end projecting beyond the webs 15 so that when the screws or bolts 9 and 10 are tightened these webs will assist the bolts in firmly holding the fitting against independent movement and really cause the same to be rigid in respect to the arm 5. The fitting 11 is provided with a head 16 having on its upper surface upstanding beads 17, 18 and 19, the beads 18 and 19 being in alignment, while the beads 17 are also in alignment but at right angles to the beads 18 and 19. In a similar manner groups of grooves 17' and 18' are formed in the center section 12' of bar 12 so that the beads 17, 18 and 19 may interengage therewith and thereby act as locking means for locking the bar 12, arms 13 and 14 and associated parts against swinging movement. Bolt 20 has its head fitted into the head 16 as shown in Figure 2, said bolt extending through a suitable aperture in head 16 and through a suitable aperture in the central section 12'. A set screw 20' as shown in Fig. 3 acts to hold rod 20 in place. A threaded member 21 is screwed on to the upper end of the bolt 20 so as to maintain the spring 22 always under tension.

A guard 23 surrounds spring 22 and is provided with an inturned flange 24 pressing on top of spring 22. This guard protects the spring and prevents anyone from grasping the same when manipulating the device. Also, if desired, the wheel or threaded member 21 may be screwed down until the guard presses tightly against section 12', whereupon the parts will be positively locked against any shifting movement until released by unscrewing the member 21. However, ordinarily member 21 is unscrewed sufficiently to cause the spring 22 to function and hold the parts interlocked so that the parts will be in a certain sense resiliently locked together. The spring 22 is intended to be sufficiently strong to hold the parts locked together so as to take care of all strains caused by the weight of the clothes, or the wind on the clothes or the clothes line.

Whenever it is desired to swing the support to the dotted line position shown in Figure 1, the hand member 25 is grasped and the parts swung inwardly. After the clothes have been hung on the clothes line and it is desired to swing the support exteriorly of the window, the hand hold 25 is grasped and moved until the parts are in the full line position shown in Figure 1. The parts are swung to a 90° angle whereby the spring 22 is overcome and then acts to bring the beads 17, 18 and 19 again into mesh with the similarly shaped groups in the section 12', thus providing a lock for the parts. The respective arms 13 and 14 are secured to the bar 12 by suitable bolts 26 and 27, said bolts extending through suitable apertures 28 and 29 in the respective end portions of bar 12. These apertures are elongated so that there may be some adjustment of the respective arms longitudinally in respect to the bar 12. Bar 12 at both ends is channel shaped so that the respective webs 30 thereof will assist the respective bolts to hold the arms 13 and 14 against any movement independent of bar 12. Preferably the outside arm 13 is longer than the arm 14, which may be termed the inside arm as this arm is the one which is always swung into or through the window 2. Arm 13 at the outer end is provided with a number of pairs of apertures 31 which are shown more in detail in Figure 5. These apertures are formed so as to receive the respective bolts 32 whenever it is desired to shift the pulley structure 33. Pulley structure 33 is identical with pulley structure 34 carried by the arm 4, and the description thereof will apply equally to both pulley structures.

As shown in Figures 4 and 5 the pulley structure 34 includes a pulley wheel 35 mounted on the bolt or pin 36 which is carried by the guards 37 and 38. It will be noted that the guard 37 is provided with a depending outer edge portion 39, while guard 38 is provided with an extending portion formed as a guiding bead 40 over which the line must pass. This extending bead 40 in coaction with the depending portion 39 guides the clothes line to and from the pulley wheel 35 so there can be no fouling of the line. A suitable nut 41 is used to hold pin or bolt 36 in place. On the pulley structure 34 there is provided a hand hold 25 so as to manipulate the device. This hand hold is omitted from pulley structure 33, but otherwise this latter structure is the same as pulley structure 34.

Whenever desired hand hold 25 may be grasped and the parts easily swung into the room as outlined in Fig. 1, or the parts may be swung outwardly. This is true even when the line is loaded with clothes, as the pulley structure 33 is further from the journal pin or bolt 20 than the pulley structure 34 whereby the parts will be balanced. As indicated in Figure 5, to secure a desired balance under ordinary circumstances the pulley structure 33 is moved to the desired pair of holes 31 according to the distance at which the outside pulley structure is spaced from the supporting device embodying the invention. If the pole coacting with the clothes line support disclosed in the present invention is 25 feet away, the pulley structure 33 is moved down to the apertures 31 indicated as being 25 feet. The same is true in regard to a distance of 40 or 50 feet or more. After the pulley structure 33 has been once positioned it is left in that position always and will function as set forth.

In swinging the device into the dotted line position shown in Figure 1, or in a reverse direction, in addition to pulling the hand hold 25 a knob or handle 42 (Figure 3) is pulled downwardly against the action of the spring 43 which bears against the head 44 of pin 44' so as to tend to continually hold the head in the socket 45 formed in section 12'. However, when the knob 42 is pulled downwardly the head 44 and spring 43 will be moved downwardly into the socket 46 formed in the head 16. After this has occurred the device may be swung inwardly to the dotted line position shown in Figure 1. When it reaches this position the head 44 will snap into the opposite socket 47 so as to lock the parts in this position. When it is desired to swing the support to a position exteriorly of the window, the knob 42 is pulled downwardly and the parts are swung outwardly. As soon as the head 44, as shown in Figure 5, comes opposite the socket 45 it will snap into this socket and lock the parts against further swinging movement. The beads 17 to 19, inclusive, will also act to lock the parts against movement, the same being urged to function properly by the spring 22 as shown in Figure 2.

It will thus be seen that the device may be easily swung from one position to another and that it is ordinarily balanced so as to remain in any desired position. However, to prevent the wind or any other influence from swinging the support undesirably, various locking means as set forth automatically function to hold the arms either in the outer or inner position.

I claim:

1. A clothes line support comprising a supporting structure, means comprising a pair of arms extending in opposite directions and lying in the same straight line, pivotally mounted on a vertical axis on said supporting structure and a pulley structure carried by each of said arms on the corresponding sides of the arms, each of said pulley structures extending in a horizontal plane and each comprising a pulley wheel adapted to function while in a horizontal plane, a lower guard positioned under said pulley wheel and projecting beyond the periphery thereof with a part of said projection portion secured flatwise against the lower surface of one of said arms, said lower guard being positioned sufficiently near said pulley wheel to prevent said clothes line moving in the space between said guard and the pulley wheel, a second guard positioned over the upper side of said pulley wheel and provided with portions projecting beyond said pulley wheel, one of said portions extending over said arm and secured thereto, said upper guard having part of the periphery thereof bent downwardly sufficiently to be substantially in the same plane as the upper edge of said pulley wheel and the lower guard having part of the periphery thereof projecting beyond the upper guard and beyond the wheel, said projecting portion being formed with a rounded bead extending toward the upper guard sufficiently to be substantially in line with the lower edge of said pulley wheel, and the said bead coacting with the bent-down portion of the upper guard to present a guide for the clothes line on the pulley, and means for rotatably mounting said pulley wheel between said guards, said means rigidly connecting said guards together and forming means extending through both of said guards and said pulley for clamping said guards to the pulley.

2. A clothes line support, including an intermediate pivoted horizontally swingable supporting structure, a pulley adacent each end of said supporting structure so arranged that both runs of the line are in a horizontal plane, and guide means on each pulley to prevent fouling of the runs of the line, the respective guide means forming supports for the respective pulleys.

3. A pulley structure, comprising a pulley wheel, a pair of guards for the pulley wheel positioned to project beyond the periphery of said wheel with a part of the projecting portion acting as a support adapted to be connected to a fixed object when the pulley structure is in use, said guards being positioned on opposite sides of said pulley wheel and sufficiently near said pulley wheel to prevent a line mounted on said wheel moving in the space between said guards and the pulley wheel, said guards at substantially all points except that acting as a support being bent at the periphery toward said pulley wheel so as to slightly overlap the pulley wheel, whereby said bent portion will extend into substantially the same plane as the respective edges of said pulley wheel.

ALFRED ANTHONY PERRY.